March 26, 1940.  W. Y. LANG  2,194,705
TESTING EQUIPMENT
Filed April 29, 1939  2 Sheets-Sheet 1
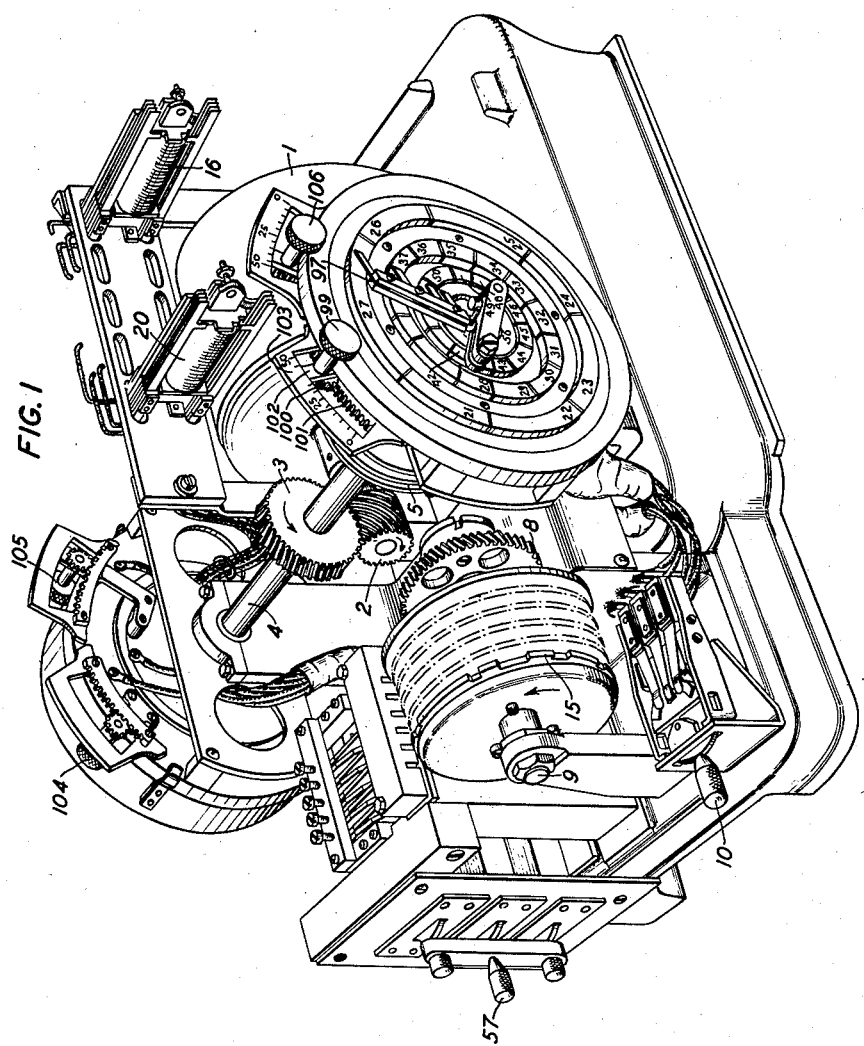
INVENTOR
W. Y. LANG
BY
ATTORNEY

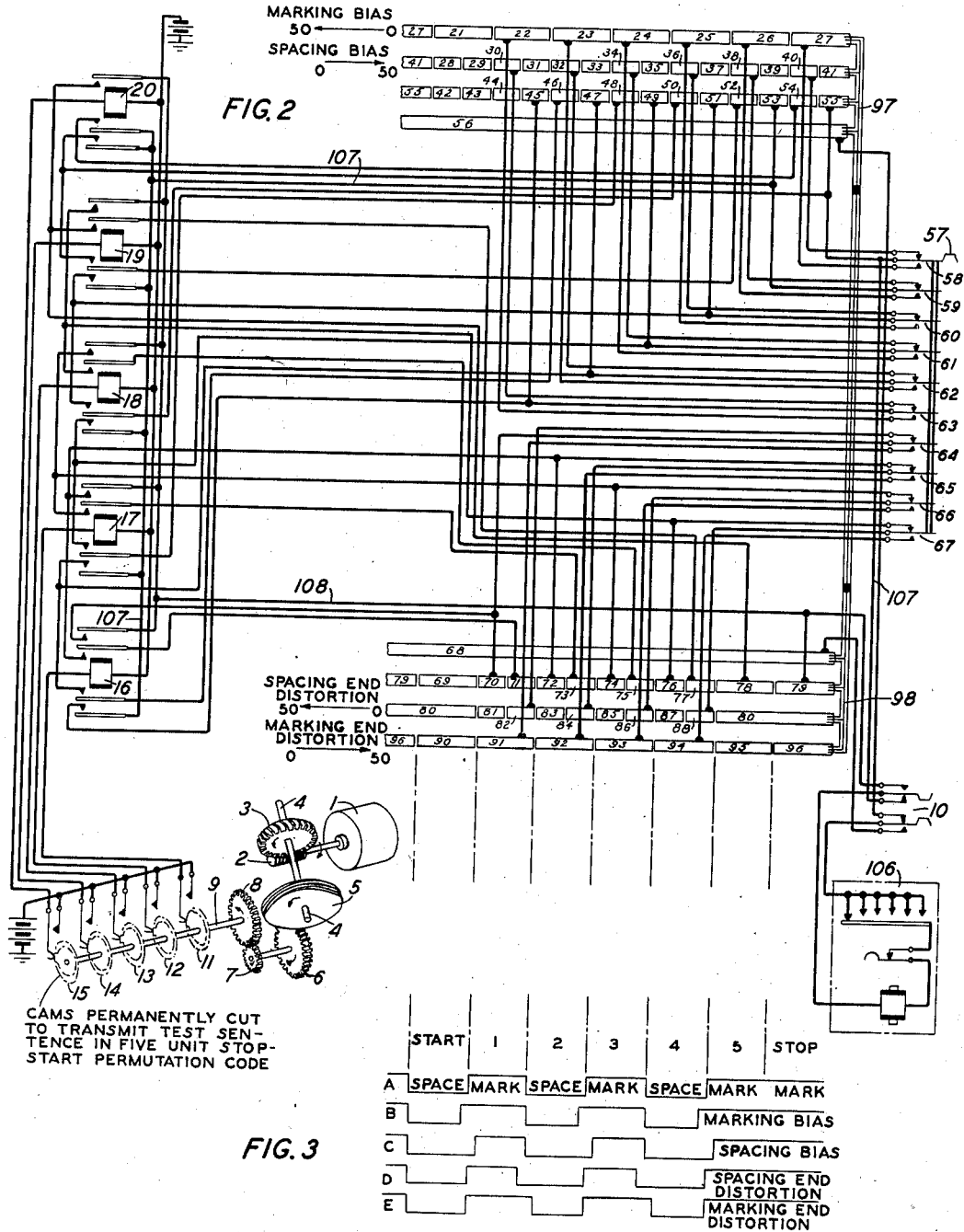

UNITED STATES PATENT OFFICE 2,194,705

TESTING EQUIPMENT

Wilmarth Y. Lang, Towaco, N. J., assignor to Bell Telephone Laboratories, Incorporated, New York, N. Y., a corporation of New York Application April 29, 1939, Serial No. 270,768

5 Claims. (Cl. 178—69)

This invention relates to improved testing equipment to be used for observing the capabilities of telegraph receiving apparatus when operated by distorted signals and is an improvement on the testing equipment forming the subject-matter of my Patent No. 2,036,059, issued March 31, 1936.

The object of my invention is to provide means for producing distorted signals affected in a number of ways all characteristic of start-stop working.

Specific to this art is that type of distortion spoken of as bias and that type of distortion spoken of as end distortion or end displacement. Bias is the advance or delay of the beginning of all marking impulses with respect to the beginning of the start impulse, and end distortion is the advance or delay of the ends of selecting marking impulses with respect to the beginning of the start impulse. Expressed in another way, it may be said that in marking bias and marking end distortion the marking pulse is elongated; in the case of bias, the elongation occurs at the beginning of the marking pulse while in the case of end distortion, the elongation occurs at the end of the marking pulse. In spacing bias and spacing end distortion, the marking pulse is shortened; in the case of bias, the shortening occurs at the beginning of the marking pulse while in the case of end distortion, the shortening occurs at the end of the marking pulse. Bias affects the stop pulse as well as all other marking pulses whereas end distortion affects only the selecting pulses—not the stop pulse.

The object of this invention is, therefore, to provide means for transmitting to apparatus to be tested impulses affected in varying degrees by marking bias, spacing bias, marking end distortion, or spacing end distortion and to quickly change from one to the other.

The use of what is here defined as marking and spacing bias for testing teletypewriters will show up errors in adjustments and inaccuracies in the manufacture of parts. However, teletypewriters which are apparently satisfactory from the standpoint of this type of distortion will still be not wholly satisfactory until tested and adjusted under conditions caused by that other type of distortion here known as end distortion. In other words, it is known that teletypewriters respond somewhat differently to the lengthening or shortening of the marking pulses when the beginning of the impulse is affected than when the end of the impulse is affected. Hence, it is necessary, in order to fully test a teletypewriter, to subject it to both marking and spacing bias and marking and spacing end distortion.

In tests using end distortion, it has been found that a receiving unit which would tolerate a given amount of bias would fail on the same amount of end distortion. Also, the optimum settings for bias and end distortion were not the same. Further study of this condition disclosed that the separation of the optimum settings for bias and end distortion was equal to the internal bias of the teletypewriter, that is, the bias present in the machine due to manufacturing variations and adjustments which prevent it from receiving correctly signals distorted with fifty per cent marking or fifty per cent spacing distortion at a single setting of the range finder arm.

The theoretically perfect teletypewriter has an orientation range of one hundred per cent, that is, it will receive correct signals over the full length of a standard transmitting impulse. Also, it will receive at the mid-point of its orientation range signals distorted up to fifty per cent marking or fifty per cent spacing, irrespective of the type of distortion, whether bias, end distortion, characteristic distortion, or fortuitous distortion.

Using bias alone in testing of teletypewriters allows setting up theoretically the amount of internal bias and end distortion which the teletypewriter will tolerate. However, these calculations are based on the theoretically perfect teletypewriter.

Using end distortion as well as bias, it is possible to determine by actual measurements the amount of internal bias present in the selector mechanism and the type of internal bias—whether marking or spacing—and from these readings it is possible to determine the remedial measures necessary to reduce the internal bias to the limits which have been determined as satisfactory for normal teletypewriter operation.

A feature of the present invention is a testing equipment having independently movable segmented rings for producing each of the four types of distortion described between zero and fifty per cent distortion and means for quickly switching from one to the other.

The drawings consist of two sheets, the first of which contains Fig. 1, showing a perspective view of the testing equipment, and the second of which contains Fig. 2, showing a circuit diagram of the electrical connections and a schematic diagram of the moving parts of the testing equipment, and Fig. 3, showing an explanatory diagram for illustrating the various kinds of distortion described. Fig. 3 is so placed with respect to Fig. 2 that the distortion of the signals can easily be understood from the description of the movement of the above-noted movable segmented rings.

Referring both to Fig. 1 and the schematic part of Fig. 2, it will be seen that a constant speed motor 1 drives a worm 2 and gear 3 whereby the shaft 4 is moved constantly in a counterclockwise direction. Another worm 5 fixed to the shaft 4 meshes with a gear 6 which, in turn, drives a pinion 7 meshed with a gear 8. The gear 6 and the pinion 7 cannot be seen in the perspective view of Fig. 1 but the manner in which gear 8 is driven will be apparent from the schematic diagram of Fig. 2. The gear 8 drives a shaft 9 on which are fixed five cams 11, 12, 13, 14 and 15 which close contacts to operate relays 16, 17, 18, 19 and 20, respectively. The cams are cut to operate the relays in such a manner that a test sentence, such as "The quick brown fox jumped over a lazy dog's back", will be transmitted repeatedly by the testing equipment.

At either end of the shaft 4 there is a set of brushes, such as 97 and 98. The brush set 97 has four contacting members traveling over three segmented rings and one solid ring. In Fig. 2 these rings are developed so that the circuit arrangement may be easily explained. The brush 98 also has four contacting members wiping over one solid ring and three segmented rings in like manner. As indicated by the notes to the right of the two upper segmented rings and the two lower segmented rings, these are made movable in the direction indicated. The uppermost segmented ring is that one movable by means of a knob 99 working a pinion 100 and causing the movement of the ring through the meshing of the rack 101. As shown in Fig. 1, the knob 99 carries an indicator 102 which cooperates with a scale 103 to indicate that the associated segmented ring has been moved from a position where it will cause impulses from zero marking bias to fifty per cent marking bias to be transmitted. Likewise, the knob 106 causes the movement of the second row of segments and moves these so as to produce impulses having spacing bias between the limits of zero and fifty per cent. At the other end of the shaft a like distributor is adjusted by means of a knob 104 to adjust marking end distortion between the limits of zero and fifty per cent and knob 105 causes an adjustment for producing impulses having spacing end distortion between the limits of zero and fifty per cent.

As the various segmented rings are indicated in Fig. 2, they are all placed at the position of zero bias or end distortion. The brushes 97 and 98 move in a direction from left to right and, as shown, are just at the point where they would be leaving the portion of the segments illustrated and starting in on their travels again at the extreme left.

Two keys are shown, one designated generally by the numeral 10 which changes the adjustment from bias to end distortion. The key in the position shown will cause the testing equipment to transmit impulses affected by the bias while in the other, or operated, position will cause the testing equipment to transmit impulses affected with end distortion. The key generally designated by the numeral 57 contains ten sets of contacts individually designated by the numerals 58 to 67, inclusive. In the upper position, as shown, the equipment will send impulses affected by either spacing bias or spacing end distortion in accordance with the position of the key 10. When the key 57 is depressed so that the alternate contacts of the various sets are made, then the equipment will transmit impulses affected with marking bias or marking end distortion in accordance with the position of key 10.

Fig. 3 indicates the code for the letter Y affected in various manners. The line A shows the various marking and spacing impulses unaffected. The line B shows the impulses affected with marking bias. It will be noted here that the marking impulses 1, 3 and 5 all start a little earlier than in the case of line B, whereas the spacing impulses start at the same time. In line C the impulses are affected with spacing bias. It will be noted that the marking impulses 1, 3 and 5 in this case all start a little later than in the case of line A. In line D the impulses are affected with spacing end distortion and here it will be noted that the marking impulses 1 and 3 end a little sooner than in the case of line A. In line E the impulses are affected with marking end distortion and it will be noted that the marking impulses 1 and 3 end somewhat later than in the case of line A.

There are dot and dash lines drawn from Fig. 3 in the direction of Fig. 2 and similar lines from Fig. 2 drawn in the direction of Fig. 3. This is to indicate that the various segments are all placed in their zero positions and make the explanation of variation of the impulses somewhat easier.

Let us assume that the cams 11 to 15 have moved to the position where the character Y is to be transmitted and the brushes 97 and 98 are sweeping over the contacts in a left-to-right direction. Let us assume that the key 10 is in the position shown and the key 57 is depressed so that impulses affected with marking bias will be transmitted.

Since the first impulse will be a marking impulse, a circuit may be traced from the teletypewriter generally indicated by the rectangle 106 and which may be assumed to be under test through the lower make contacts of the key 10, the solid ring 56, the brushes 97, segment 22, the lower contact of contact set 63, the segment 45 and in parallel therewith the front contact and lowermost armature of relay 16, conductor 107, the make contact of the upper set of keys 10 to the teletypewriter 106. With the upper row of segments 21 to 27, inclusive, in the position shown, the marking impulse will be exactly the length of the impulse indicated as 1 in Fig. 3. If, however, the set of segments 21 to 27, inclusive, is moved toward the left, then the marking impulse will be started somewhat earlier since the upper contact of the brush 97 will come in contact with segment 22 prior to the dot and dash line indicating the normal start of impulse 1. Since segments 22 and 45 are connected together through the key-set 63, this marking impulse will be elongated by the amount of the movement of the upper segments 21 to 27, inclusive.

If the key 57 is moved upward and to the position as shown, then key-set 63 will cause segments 30 and 45 to be connected together and the marking impulse will be traced through ring 56 and first segment 30 and last segment 45. In the position as shown, the marking impulse will be of exact length for zero bias. If, however, the set of segments 28 to 41, inclusive, is moved toward the right, then the marking impulse will start somewhat later and thus be shortened.

In case two marking impulses are to follow each other, in order to prevent an unwanted spacing impulse therebetween, the segment 46 is now connected through the inner lower armature of relay 16 to the segment 47. This is known as a bridging segment and will cause a second marking impulse immediately following the first marking impulse to be merged therewith.

In like manner, if the key 10 is operated so that the outer contacts are made and the key 57 is operated downwardly, then a circuit may be traced from the teletypewriter 106, through the lower contacts thereof, the solid ring 68, thence through the brushes 98 to segment 91, now connected through the contacts of key-set 64 to segment 70 and thus to the front contact and outer upper armature of relay 16 to conductor 108 and thus to the upper contacts of key 10 and eventually back to the teletypewriter 106. With the segments 90 to 96, inclusive, as shown, the impulses will be unaffected but if the segments are moved toward the right, then the impulses will be lengthened but the lengthening will take place at the end of the impulse, as indicated at line E of Fig. 3.

With key 10 operated in its alternate position and key 57 as shown, the circuit may be traced from ring 68 through segments 70 and 82 which are connected by the key-set 64 and thence to the front contact and upper outer armature of relay 16 to conductor 108. With the segments 80 to 88, inclusive, as shown, the impulses will not be affected but if this row of segments is moved toward the left, as indicated, then the impulse will be shortened, as indicated in line D of Fig. 3. Here, also, in order to merge two marking impulses, one following the other into one, a connection is made from segment 71 through the inner upper armature of relay 16 to segment 72 in a manner similar to that described above in connection with segment 46.

The various mechanical arrangements of the parts of the mounting of the relays 16 to 20, inclusive, of which only relays 16 and 20 are shown, and the general design of the machine will be apparent from the perspective view in Fig. 1.

What is claimed is:

1. In a teletypewriter communication system, instrumentalities for testing the adjustment of receiving teletypewriter apparatus to correctly receive signals affected by bias and end distortion, said instrumentalities including in combination a transmitter-distributor provided with two segmented face-plates, means for enabling one of said segmented face-plates to transmit permutation code signals affected by bias, means for enabling the other of said segmented face-plates to transmit permutation code signals affected by end distortion, and switching means for switching the transmitter-distributor from transmission over one of said face-plates to transmission over the other of said face-plates.

2. In a teletypewriter communication system, instrumentalities for testing the adjustment of receiving teletypewriter apparatus to correctly receive signals affected by bias and end distortion, said instrumentalities including in combination a transmitter-distributor provided with two segmented face-plates, each of said segmented face-plates having movable segmented rings, control means for adjusting the positions of said movable segmented rings, said control means being individual to each face-plate, means for enabling one of said segmented face-plates to transmit permutation code signals affected by variable amounts of bias, means for enabling the other of said segmented face-plates to transmit permutation code signals affected by variable amounts of end distortion, and switching means for switching the transmitter-distributor from transmission over one of said face-plates to transmission over the other of said face-plates.

3. A transmitter-distributor for repeatedly transmitting a test sentence in multiunit stop-start permutation code, comprising independently movable sets of commutator segments for affecting the impulses of said code with varying amounts of bias and end distortion and switching means for instantly changing the output of said transmitter-distributor from one whose impulses are affected with a given percentage of marking bias to one whose impulses are affected with another given percentage of spacing bias or to one whose impulses are affected with another given percentage of marking end distortion or to one whose impulses are affected with another given percentage of spacing end distortion.

4. A transmitter-distributor for repeatedly transmitting a test sentence in multiunit stop-start permutation code, comprising independently movable means to lengthen marking impulses at the beginning thereof, to lengthen marking impulses at the end thereof, to shorten marking impulses at the beginning thereof and to shorten marking impulses at the end thereof, and switching means for rendering at one time any one of said independently movable means effective.

5. A transmitter-distributor for repeatedly transmitting a fixed test sentence in permutation code, comprising independently movable means for lengthening and shortening the marking impulses being transmitted and switching means for selecting variously affected transmission.

WILMARTH Y. LANG.